United States Patent [19]

Yeadon

[11] Patent Number: 4,647,158
[45] Date of Patent: Mar. 3, 1987

[54] MODIFYING COHERENT RADIATION
[75] Inventor: Edward C. Yeadon, London, England
[73] Assignee: Crosfield Electronics Limited, Herts, England
[21] Appl. No.: 728,897
[22] Filed: Apr. 30, 1985
[30] Foreign Application Priority Data Apr. 30, 1984 [GB] United Kingdom ............... 8410973

[51] Int. Cl.⁴ .............................................. G02F 1/11
[52] U.S. Cl. ............................... 350/358; 350/162.11; 350/320
[58] Field of Search ................... 350/96.25, 358, 320, 350/162.11

[56] References Cited

U.S. PATENT DOCUMENTS 3,941,456  3/1976  Schilz ............................... 350/161
4,170,028 10/1979  DeBenedictis ..................... 358/285

FOREIGN PATENT DOCUMENTS 57-85279  5/1982  Japan .

OTHER PUBLICATIONS

Imai, Yoh et al; "Optical Coherence Modulation by Ultrasonic Waves 2. Application to Speckle Reduction", *Applied Optics, vol. 19. No. 20, Oct. 15, 1980, pp. 3541-3544.*
Kalnitskaya, T. Ya. et al, "Methods of Smoothing the Speckle Pattern at the Output of Filler Illuminators", *Optics and Spectroscopy,* (USSR) vol. 44, No. 2, pp. 219-221, Feb., 1978.

Primary Examiner—Bruce Y. Arnold
Attorney, Agent, or Firm—Sughrue, Mion, Zinn, Macpeak and Seas

[57] ABSTRACT

A method and apparatus for modifying the phase characteristics of a coherent beam of radiation (7) are described. The apparatus comprises a laser (6) for generating a coherent beam of optical radiation (7). A support (1) for a record medium (1') sensitive to the radiation is provided, the beam of radiation (7) and the record medium (1') being relatively movable whereby the beam of radiation scans the record medium. First modulation means including an E/O modulator (8) and beam computer (9) is provided for modulating the beam (7) in accordance with image information. Second modulation means including an A/O modulator (10) or phase diffraction grating is responsive to a control function generated by a control function generator (11). The control function has a frequency which is repeatedly swept through a range of frequencies at a relatively fast rate to control the transmission characteristics of the grating. A substantially spatially incoherent beam of radiation is transmitted from the phase diffraction grating.

11 Claims, 5 Drawing Figures

MODIFYING COHERENT RADIATION

The invention relates to methods and apparatus for modifying the phase characteristics of a coherent beam of radiation.

In a number of fields, there is a requirement to transmit beams of coherent radiation, particularly laser light, along fibre optic. Coherent radiation is radiation in which the waves are in phase both spatially and temporally. This can lead to difficulties if there are any bends in the fibre optic. This is because the bends will cause different parts of the beam to be reflected at slightly different positions along the fibre optic wall and cause the propagation of a number of different modes leading to destructive and constructive interference and a beam emitted from the fibre optic which has a speckled pattern or granulation. This is an example of a more general phenomenon in which radiation is transmitted through a medium which scatters the radiation statistically.

In the field of image generation where a record medium is exposed to a laser light beam which is modulated in accordance with tonal density information during relative movement between the record medium and the laser light beam, the speckled pattern resulting from transmission of the laser light beam through fibre optic is particularly undesirable and can lead to inferior image reproduction. The images exhibit a statistical distribution of intensity maxima and minima.

One attempt at solving this problem is described in U.S. Pat. No. 3,941,456. This discloses apparatus which provides a diffuser to expand a beam of radiation which is incident on an acousto-optic device. The acousto-optic device is controlled by an aperiodic ultrasonic wave caused by exciting a plurality of ultrasonic frequencies in the device. This form of excitation reduces the granulation. The apparatus suffers from the disadvantage of having to provide a diffuser and means for exciting a plurality of ultrasonic frequencies.

Another attempt at solving the problem is described in an article entitled "Optical Coherence Modulation by Ultrasonic Waves" in Applied Optics, Vol 19, No. 20, pp3541–3543. This again makes use of a diffuser and passes the diffused optical radiation twice through an acousto-optic device by reflection from a mirror. The device is controlled by a 10 MHz ultrasonic wave. Again, this requires the use of a diffuser and an additional mirror leading to a complicated arrangement.

An article entitled "Methods of Smoothing the Speckle Pattern at the output of fibre illuminators" in Opt. Spectrose (USSR) 44(2) February 1978 pp219–221 describes an alternative approach to solving the problem. In this approach, a beam of radiation is injected into a length of optical fibre which is vibrated so as to alter the angle at which the beam enters the fibre. This mechanical deflection of the fibre is very slow and is not satisfactory for highly accurate image generation systems.

In accordance with one aspect of the present invention, a method of modifying the phase characteristics of a coherent beam of radiation comprises passing the beam of radiation through a phase diffraction grating; and applying a control function to the phase diffraction grating, the transmission characteristics of the grating being responsive to the frequency of the control function, and is characterised in that the frequency of the control function is repeatedly swept through a range of working frequencies at a relatively fast rate whereby a substantially spatially incoherent beam of radiation is transmitted from the phase diffraction grating.

In accordance with a second aspect of the present invention, image generation apparatus comprises a radiation source for generating a coherent beam of radiation; a support for a record medium sensitive to the radiation, the beam of radiation and the record medium being relatively moveable whereby the beam of radiation scans the record medium support; first modulation means for modulating the beam of radiation in accordance with image information; second modulation means comprising a phase diffraction grating; and a control function generator for generating a control function having a frequency which is repeatedly swept through a range of frequencies at a relatively fast rate to control the transmission characteristics of the grating, whereby a substantially spatially incoherent beam of radiation is transmitted from the phase diffraction grating.

With this invention, the use of a control function with a repeatedly swept frequency causes the phase of different parts of the coherent radiation to be retarded by different amounts leading to non-correlation between the phases of different parts of the beam and thus resulting in a substantially spatially incoherent beam.

By "relatively fast" we mean that several cycles of the sweeping frequency (eg. 3 or more) take place in the integration time of the record medium.

One particularly convenient form of phase diffraction grating is an acousto-optic (A/O) modulator. In an A/O modulator, a voltage signal is applied to a transducer mounted on glass or a suitable crystal which causes the generation of an acoustic signal in the crystal which is transmitted through the crystal in the form of compressions and rarefactions. The refractive index of the crystal varies in response to these compressions and is relatively high in the compression areas and relatively low in the non-compression areas. These differences in refractive index cause an incoming light beam to be diffracted through a diffraction angle whose magnitude is determined by the frequency of the acoustic signal and hence the frequency of the control function or voltage signal. The amplitude of the control function (or voltage signal) controls the distribution of energy between the zero order transmitted beam and the first order beam. Diffraction is achieved because interaction between the acoustic wave and the incoming light beam causes phase retardation of the light beam.

Typically, the range of working frequencies of the control function will be between 10 and 100 MHz.

In one example, the frequency of the control function could be swept between 60 MHz and 80 MHz. The frequency may be swept in a ramp, saw-tooth, or sinusoidal manner at for example 500 KHz or more.

Where the method is employed in a method of image generation in which a record medium moves relatively to an exposing beam of radiation, it is preferable for the sweep rate to be faster than the time for the record medium to traverse a distance equal to the width of the exposing beam. This is because within a beam width changes in phase cannot be detected, the record medium being sensitive to intensity and not phase. In this way, the problem of a speckled pattern is avoided. In general, it is preferable if in the case of an A/O modulator the fluctuations in phase of the transmitted beam are much more rapid than the time for the acoustic wave to traverse the beam width.

It will be appreciated that one of the main applications of the method is to enable laser light to be coupled to standard fibre optic bundles and this is achieved without the formation of speckled patterns which occurs with normal coherent laser light.

The radiation is preferably optical having wavelengths in the visible waveband and/or adjacent non-visible waveband such as the ultraviolet.

Typically, the first modulation means may comprise an A/O modulator or an electro-optic (E/O) modulator. In some cases, however, the first and second modulating means may be combined and comprise a single A/O modulator. In this latter case, the envelope of the control function (applied rf power) can be modulated to follow the required picture signal. When maximum rf power is applied to the modulator, the incoming beam will be fully diffracted into an incoherent beam whereas if a partial level of rf power is applied then part of the incoming beam will remain undeflected and be directed to a conventional absorber while the remainder of the beam will be diffracted as before. Energy will be partitioned between the two beams in accordance with the level of the rf power applied.

The method and apparatus could be used in a three wavelength colour mixing image generation system for generating proofs on colour photographic paper. In this case, three separate laser beams will be generated for red, green, and blue respectively. These will be fed to the conventional first modulating means comprising three E/O of A/O modulators and then to the second modulating means comprising three A/O modulators whose control functions comprise swept frequency RF and three fibre optic bundles into which the substantially incoherent beams are coupled.

Two image generation system incorporating examples of methods and apparatus in accordance with the invention will be described with reference to the accompanying diagrammatic drawings, in which.

Figure 1:
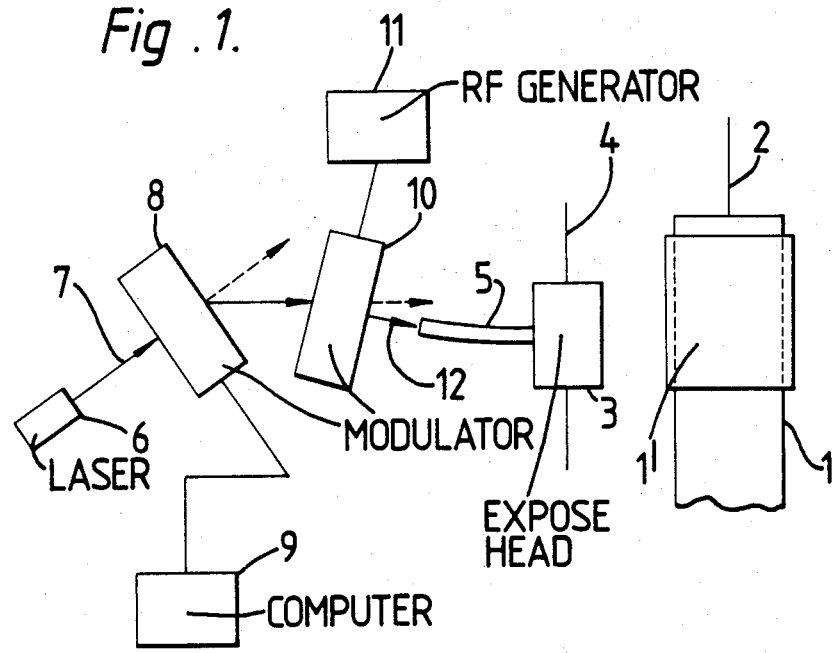
FIG. 1 is a block diagram illustrating one image generation system.

The image generation system shown in FIG. 1 is similar to that found in the Crosfield Magnascan 600 Series and comprises an exposing drum 1 rotatable about its axis 2, the drum 1 being positioned adjacent an expose head 3. The expose head is mounted on a lead screw 4 along which it moves in use. For the sake of simplicity, a single fibre optic bundle 5 is illustrated to guide a beam of radiation to the expose head 3. In practice fibre optic bundles would be provided, each associated with respective modulators. A laser 6 is provided. The laser beam 7 from the laser 6 impinges on an E/O modulator 8 which is controlled in a conventional manner by a beam computer 9 in response to previously generated tonal density and half-tone information. In this case, the zero order beam from the modulator 8 is fed to an A/O modulator 10 whose transmission characteristics are controlled by a controller 11. The A/O modulator 10 converts the incoming coherent laser beam into a substantially spatially incoherent beam 12 which is fed to the fibre optic bundle 5.

In operation, photographic film 1' is mounted on the exposing drum 1 which is rotated relatively rapidly about its axis 2. At the same time, the lead screw 4 is rotated relatively slowly so that the expose head 3 moves alongside the exposing drum 1 and the light beams emitted from the expose head 3 describe a helical path on the photographic film.

Figure 2:
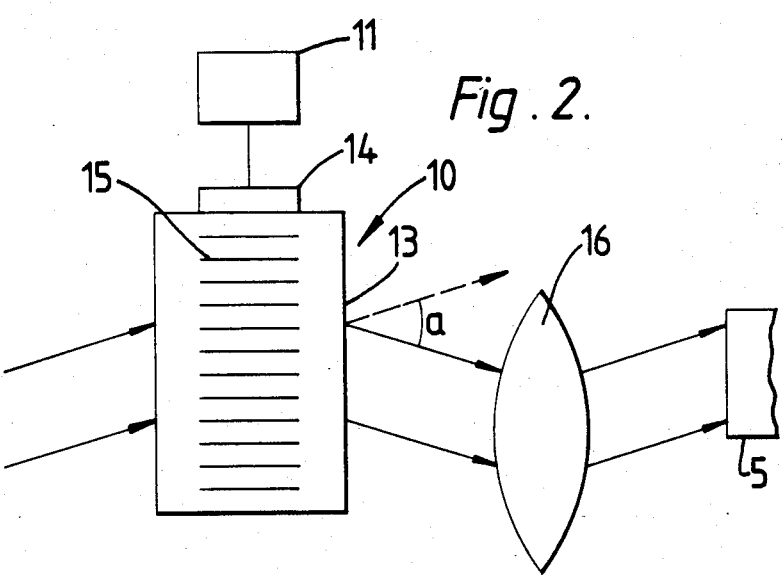
FIG. 2 illustrates in more detail the apparatus for modifying phase characteristics of the laser beam.

The A/O modulator 10 is shown in more detail in FIG. 2. The modulator comprises a block of suitable crystal 13 to which is bonded a transducer 14. A typical A/O modulator is the AOM001 manufactured by Gooch and Housego. The controller 11 is connected to the transducer 14 and generates an rf signal which is applied to the transducer 4. The rf signal causes an acoustic wave to be generated in the crystal 13 which is transmitted in the form of compressions and rarefactions through the crystal. This is indicated diagrammatically at 15. Each area of compression causes an increase in the refractive index of the crystal at that position and this in turn causes phase retardation to occur to the incoming laser beam. Thus the laser beam will be diffracted through an angle 'a' whose size is dependent on the frequency of the rf drive power. The modulator 10 also includes a lens 16 which guides the outgoing laser beam into the fibre optic 5.

In order to reduce granulation, the frequency of the rf drive power is swept through a range of working frequencies, for example between 50 and 100 MHz. This will cause effectively a random arrangement of compressions within the crystal 13 and thus different parts of the incoming laser beam will be phase retarded by different, random amounts so that the beam emitted by the crystal 13 will be substantially spatially incoherent.

Figure 3:
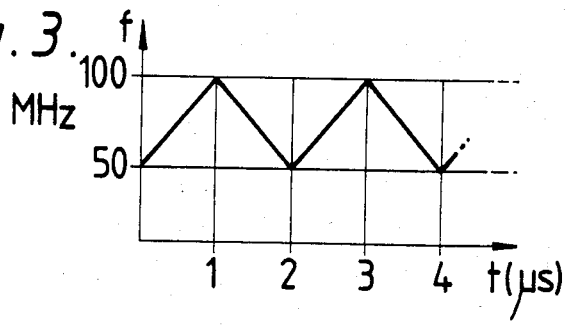
FIG. 3 illustrates the variation in frequency with time of the voltage signal applied to the A/O modulator shown in FIG. 1.

In the case of the apparatus shown in FIG. 1, the laser beam will typically have a width of 1 mm and it will take about 5 microseconds for the photographic film to traverse the beam width. This is known as the 'dwell time'. Thus, changes in phase should be achieved more rapidly than the dwell time and, as shown in FIG. 3, in one method the voltage signal is swept through the range of frequencies in one microsecond. This is well within the dwell time and means that phase differences will not be apparent on the film being exposed. The sweeping of the voltage signal is in a saw-tooth fashion in FIG. 3.

Typically the rf drive power will be a few hundred milliwatts although the actual level will depend on the material chosen for the A/O interaction medium and on the wavelength of the light. For example, the drive power could be as low as 200 milliwatts but will normally be in the order of 400 milliwatts or less.

Figure 4:
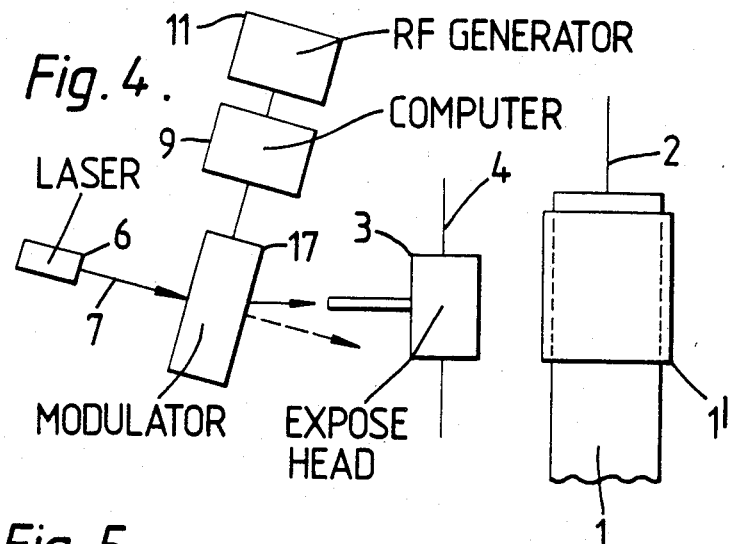
FIG. 4 is a block diagram illustrating a second image generation system.
Figure 5:
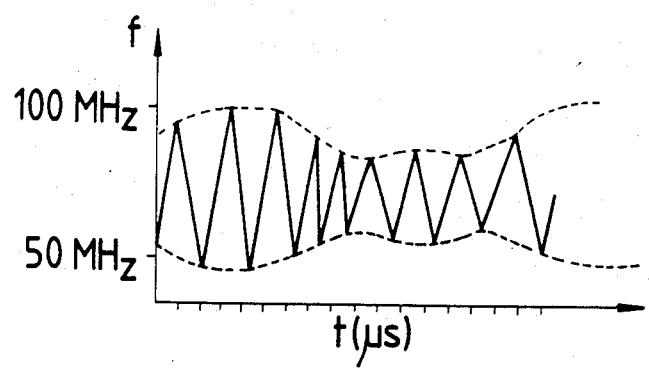
FIG. 5 illustrates the variation in frequency with time of the voltage signal applied to the A/O modulator shown in FIG. 4.

The example shown in FIG. 4 is similar to that of FIG. 1 except that the modulators 8, 10 are provided by a common A/O modulator 17. In this example, the rf generator 11 provides a repeatedly swept control signal to the beam computer 9 which modulates the signal in accordance with image density and half-tone information before the control signal is applied to the modulator control 17. The form of the control signal applied to the modulator 17 is illustrated in FIG. 5 where it can be seen that the envelope of the control signal generated by the generator 11 has been modulated according to the image density information.

We claim:

1. A method of modifying the phase characteristics of a coherent beam of radiation, the method comprising passing said beam of radiation through a phase diffraction grating; and applying a control function having a frequency to said phase diffraction grating, the transmission characteristics of said grating being responsive to said frequency of said control function, said step of applying a control function comprising repeatedly sweeping said frequency of said control function through a range of working frequencies at a relatively fast rate whereby a substantially spatially incoherent beam of radiation is transmitted from said phase diffraction grating.

2. A method according to claim 1, wherein said range of working frequencies of said control function lies between 10 and 100 MHz.

3. A method according to claim 2, wherein said range of working frequencies lies between 60 MHz and 80 MHz.

4. A method according to claim 1, wherein said control function is swept in one of a ramp, saw-tooth, and sinusoidal manner.

5. A method according to claim 1, wherein said control function is swept at at least 500 Khz.

6. A method according to claim 1, wherein said radiation is optical radiation.

7. A method according to claim 1 in which a record medium is exposed to and moves relatively to said beam of radiation, said sweep rate being faster than the time for said record medium to traverse a distance equal to the width of the exposing beam.

8. Image generation apparatus comprising a radiation source for generating a coherent beam of radiation; a support for a record medium sensitive to said radiation, said beam of radiation and said record medium support being relatively moveable whereby said beam of radiation is adapted to scan said record medium; first modulation means for modulating said beam of radiation in accordance with image information; second modulation means comprising a phase diffraction grating; and a control function generator for generating a control function having a frequency which is repeatedly swept through a range of frequencies at a relatively fast rate to control the transmission characteristics of said grating, whereby a substantially spatially incoherent beam of radiation is transmitted from said phase diffraction grating.

9. Apparatus according to claim 8, wherein said phase diffraction grating comprises an acousto-optic (A/O) modulator.

10. Apparatus according to claim 8, wherein said radiation source comprises a laser.

11. Apparatus according to claim 8, wherein said first and second modulation means are provided by a common A/O modulator said control function generator modulating the envelope of said control function in accordance with image information.

* * * * *